United States Patent Office 3,781,420
Patented Dec. 25, 1973

3,781,420
ANTIBIOTIC TSUSHIMYCIN AND
PRODUCTION THEREOF
Haruo Nishimura, Ashiya-shi, and Hideo Otsuka, Toyonaka-shi, Japan, assignors to Shionogi & Co., Ltd., Higashi-ku, Osaka, Japan
Continuation of abandoned application Ser. No. 762,036, Sept. 24, 1968. This application Dec. 19, 1969, Ser. No. 882,784
Claims priority, application Japan, Oct. 4, 1967, 42/63,957; Oct. 7, 1967, 42/64,842
Int. Cl. A61k 21/00
U.S. Cl. 424—118                  6 Claims

ABSTRACT OF THE DISCLOSURE

A new antibiotic, tsushimycin, having the antibacterial properties with low toxicity, and a process for preparing the same being characterized by cultivating a tsushimycin-producing strain of microorganism belonging to the genus Streptomyces in an aqueous nutrient containing medium under aerobic conditions. Hydrogenated tsushimycin being produced by a catalytic reduction and having similar antibacterial properties and toxicity.

---

Figure 1:
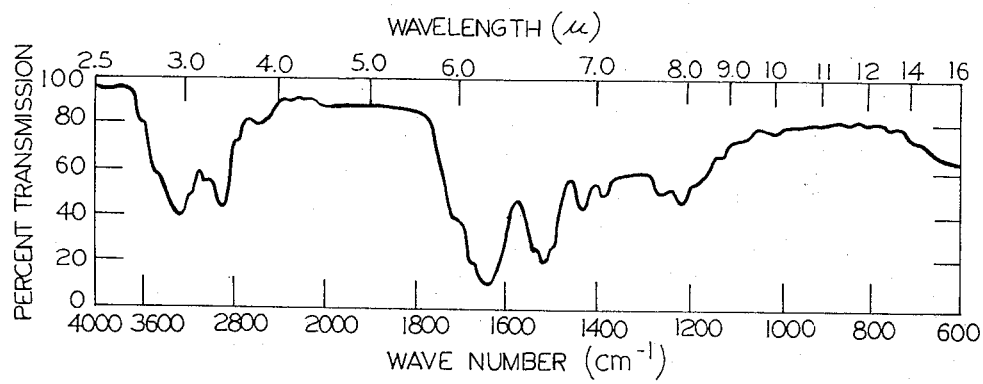

This application is a continuation application of Ser. No. 762,036, filed Sept. 24, 1968, now abandoned.

This invention relates to a useful antibiotic designated "tsushimycin." Further, it relates to its production by fermentation, to methods for its recovery and concentration from crude solutions, such as fermentation broths, and to processes for its purification. The invention includes within its scope the antibiotic in dilute forms, as crude concentrates, and in pure crystalline forms. These novel products are useful, for example, in combating pathogenic microorganisms, especially gram-positive bacteria. They are also characterized in low toxicity which sufficiently secures their safety in the medical applications.

In the course of search for new antibiotics, Streptomyces strains indexed Z-237, Z-242 and N-946 in the collection of Shionogi Research Laboratory, Shionogi & Co., Ltd., Osaka, Japan, and on deposit with the American Type Culture Collection under the accession numbers ATCC Nos. 21139, 21140 and 21141, respectively, have been found to produce a new antibiotic, tsushimycin. Accordingly, the principal object of the invention is to provide a new and useful antibiotic which is active against a number of different microorganisms.

The strains Z-237 and N-946 were isolated from soil samples collected at Tsushima Island, Nagasaki Prefecture, Japan in 1961, and the strain Z-242 from a soil sample collected at Nishinomiya-shi, Hyogo Prefecture, Japan in 1961. The morphological, cultural and physiological characteristics of these three strains were studied and compared with known species reported so far belonging to the genus Streptomyces. As the result of this study, the strains Z-237 and Z-242 were decided to be same species of Streptomyces pseudogriselous and the strain N-946 to be a new varietas of Streptomyces pseudogriseolus, the latter having been named Streptomyces pseudogriseolus var. glucofermentans, var. nov.

CHARACTERIZATION OF THE STREPTOMYCES Z-237

Morphological characteristics

The morphological properties were observed on Bennett's agar medium after 14 days' incubation at 28° C. and detailed observations were made according to the agar-cylinder culture method (Nishimura et al.: J. Antibiotics (A), vol. 10, p. 277 (1957)). The structure of spore surface was observed with an electron microscope.

Aerial mycelium showing powdery to velvety is formed abundantly on Bennett's agar. The sporophores are formed on aerial mycelium. The branching manner of sporulating hyphae is no verticillus type and the form of sporulating hyphae is spiral. The spores are formed in chain with more than 10 conidia, and the shape of the spore is oval to short cylindrical (0.6 to 0.8μ in width, 1.0 to 1.4μ in length). The structure of spore surface is spiny. Sporangium and flagellated spore are not observed, and also fragmentation and sclerotia in substrate mycelium are not observed.

Cultural characteristics

The observation was made through a 14 days' incubation period at 28° C. The results are shown in the following Table 1.

TABLE 1

| Medium | Property | Result |
|---|---|---|
| Czapek's agar | Growth | Good. |
|  | AM | Good, brownish white to light brownish gray. |
|  | SM | Light brownish gray. |
|  | SP | None. |
| Glycerin Czapek's agar | Growth | Good. |
|  | AM | Good, brownish white. |
|  | SM | Yellowish gray. |
|  | SP | None. |
| Glucose-asparagine agar | Growth | Good to fair. |
|  | AM | Poor, yellowish gray. |
|  | SM | Yellowish gray. |
|  | SP | None. |
| Glycerin-asparagine agar | Growth | Good. |
|  | AM | Good to fair, brownish white. |
|  | SM | Light brownish gray to pale yellowish brown. |
|  | SP | None. |
| Calcium malate agar | Growth | Fair to poor. |
|  | AM | Fair, grayish white. |
|  | SM | Yellowish gray. |
|  | SP | None. |

TABLE 1—Continued

| Medium | Property | Result |
|---|---|---|
| Starch agar | Growth | Fair. |
| | AM | Fair, light brownish gray. |
| | SM | Pale yellowish brown. |
| | SP | None. |
| Nutrient agar | Growth | Fair. |
| | AM | Poor, yellowish gray to brownish white. |
| | SM | Pale yellow to pale yellowish brown. |
| | SP | None. |
| Glucose-peptone agar | Growth | Fair. |
| | AM | Fair to poor, white. |
| | SM | Pale yellowish brown. |
| | SP | None. |
| Potato | Growth | Good. |
| | AM | Fair, brownish white. |
| | SM | Grayish yellow brown. |
| | SP | None. |
| Bennett's agar | Growth | Good. |
| | AM | Good, light brownish gray. |
| | SM | Light brownish gray to brownish gray. |
| | SP | None. |
| Gelatin medium | Growth | Fair. |
| | AM | No aerial mycelium. |
| | SM | Pale brown. |
| | SP | None. |
| Milk medium | Growth | Good. |
| | AM | Poor, brownish white. |
| | SM | Pale brown. |
| | SP | None. |
| Cellulose agar | Growth | No growth to scant. |
| | AM | |
| | SM | |
| | SP | |
| Bennett's agar | Growth at 28° C | Good. |
| | Growth at 37° C | Do. |
| | Growth at 45° C | Do. |
| Glucose broth | Growth type | Ring type. |

NOTE.—AM=Aerial mycelium; SM=Substrate mycelium; SP=Soluble pigment.

Physiological characteristics

The observation was made after incubation at 28° C. for 14 days, and the results are shown in the following Table 2.

TABLE 2

| Property: | Result |
|---|---|
| Production of melanoid pigment | Negative. |
| Tyrosinase reaction | Do. |
| Acid formation from glucose | Do. |
| Nitrate reduction | Positive. |
| Starch hydrolysis | Do. |
| Gelatin liquefaction | Do. |
| Milk peptonization | Do. |
| Producing antibiotic | Acyl peptide. |

This microorganism grows under an aerobic condition, and the optimum pH range for growth is 7.0 to 7.2. The utilization of carbon sources on the basal medium of Pridham and Gottlieb by the microorganism was observed after incubation at 28° C. for 14 days, and the results are shown in the following Table 3, wherein the marks "+" and "++" indicate increasing utilization and the mark "−" no utilization.

TABLE 3

| Carbon source | Result | |
|---|---|---|
| Glycerin | Good growth | ++ |
| Glucose | do | ++ |
| Xylose | do | ++ |
| Inositol | do | ++ |
| Mannitol | do | ++ |
| Fructose | do | ++ |
| Rhamnose | do | ++ |
| Galactose | do | ++ |
| Maltose | do | ++ |

TABLE 3—Continued

| Carbon source | Result | |
|---|---|---|
| Mannose | do | ++ |
| Arabinose | Fair growth | + |
| Sucrose | do | + |
| Lactose | do | + |
| Raffinose | No growth | − |
| Inulin | do | − |
| Sorbitol | do | − |
| Dulcitol | do | − |
| Salicin | do | − |
| Sorbose | do | − |

CHARACTERIZATION OF THE STREPTOMYCES Z-242

Morphological characteristics

The morphological properties were observed in the same manner as described above.

Aerial mycelium showing powdery to velvety is formed abundantly on Bennett's agar. The sporophores are formed on aerial mycelium. The branching manner of sporulating hyphae is no verticillus type and the form of sporulating hyphae is spiral. The spores are formed in chain with more than 10 conidia, and the shape of the spore is oval to short cylindrical (0.6 to 0.9μ in width, 1.0 to 1.3μ in length). The structure of spore surface is spiny. Sporangium and flagellated spore are not observed, and also fragmentation and sclerotia in substrate mycelium are not observed.

Cultural characteristics

The observation of the cultural characteristics was made in the same manner as described above, and the results are shown in the following Table 4.

TABLE 4

| Medium | Property | Result |
|---|---|---|
| Czapek's agar | Growth | Good. |
| | AM | Good, brownish white to light brownish gray. |
| | SM | Light brownish gray. |
| | SP | None. |
| Glycerin-Czapek's agar | Growth | Good. |
| | AM | Good, brownish white. |
| | SM | Pale brown. |
| | SP | None. |
| Glucose-asparagine agar | Growth | Fair. |
| | AM | No aerial mycelium to scant. |
| | SM | Yellowish gray. |
| | SP | None. |
| Glycerin-asparagine agar | Growth | Good. |
| | AM | Good to fair, brownish white. |
| | SM | Light brownish gray to pale yellowish brown. |
| | SP | None. |
| Calcium malate agar | Growth | Fair to poor. |
| | AM | Poor, grayish white. |
| | SM | Yellowish gray. |
| | SP | None. |
| Starch agar | Growth | Fair. |
| | AM | Fair, light brownish gray. |
| | SM | Pale yellowish brown. |
| | SP | None. |
| Nutrient agar | Growth | Fair. |
| | AM | Poor, brownish white. |
| | SM | Pale yellow to pale yellowish brown. |
| | SP | None. |
| Glucose-peptone agar | Growth | Fair. |
| | AM | Poor, white. |
| | SM | Pale yellowish brown. |
| | SP | None. |
| Potato | Growth | Good. |
| | AM | Fair, brownish white. |
| | SM | Grayish yellow brown. |
| | SP | None. |
| Bennett's agar | Growth | Good. |
| | AM | Good, light brownish gray. |
| | SM | Light brownish gray to brownish gray. |
| | SP | None. |
| Gelatin medium | Growth | Fair. |
| | AM | No aerial mycelium. |
| | SM | Pale brown. |
| | SP | None. |
| Milk medium | Growth | Good. |
| | AM | Poor, brownish white. |
| | SM | Pale brown. |
| | SP | None. |
| Cellulose agar | Growth | No growth to scant. |
| | AM | |
| | SM | |
| | SP | |
| Bennett's agar | Growth at 28° C | Good. |
| | Growth at 37° C | Do. |
| | Growth at 45° C | Do. |
| Glucose broth | Growth type | Ring type. |

NOTE.—AM=Aerial mycelium; SM=Substrate mycelium; SP=Soluble pigment.

Physiological characteristics

The observation of the physiological characteristics was made in the same manner as described above, and the results are shown in the following Table 5.

TABLE 5

| Property: | Result |
|---|---|
| Production of melanoid pigment | Negative. |
| Tyrosinase reaction | Do. |
| Acid formation from glucose | Do. |
| Nitrate reduction | Positive. |
| Starch hydrolysis | Do. |
| Gelatin liquefaction | Do. |
| Milk peptonization | Do. |
| Producing antibiotic | Acyl peptide. |

This microorganism grows under an aerobic condition, and the optimum pH range for growth is 7.0 to 7.2. The utilization of carbon sources was observed in the same manner as described above, and the results are shown in the following Table 6, wherein the marks "+" and "++" indicate increasing utilization, the mark "−" no utilization and the mark "±" doubtful utilization.

TABLE 6

| Carbon source | Result | |
|---|---|---|
| Glycerin | Good growth | ++ |
| Glucose | do | ++ |
| Inositol | do | ++ |
| Mannitol | do | ++ |
| Rhamnose | do | ++ |
| Galactose | do | ++ |
| Arabinose | Fair growth | + |
| Xylose | do | + |
| Mannose | do | + |
| Fructose | Faint growth | ± |
| Lactose | do | ± |
| Sucrose | No growth | − |
| Raffinose | do | − |
| Maltose | do | − |
| Inulin | do | − |
| Sorbitol | do | − |
| Dulcitol | do | − |
| Salicin | do | − |
| Sorbose | do | − |

CHARACTERIZATION OF THE STREPTOMYCES N-946

Morphological characteristics

The morphological properties were observed in the same manner as described above.

Aerial mycelium showing powdery to velvety is formed abundantly on Bennett's agar. The sporophores are formed on aerial mycelium. The branching manner of sporulating hyphae is no verticillus type and the form of spormulating hyphae is spiral. The spores are formed in chain with more than 10 conidia, and the shape of the spore is cylindrical to oval (0.5 to 0.7µ in width, 0.8 to 1.3µ in length). The structure of spore surface is spiny. Sporangium and flagellated spore are not observed and also fragmentation and sclerotia in substrate mycelium are not observed.

Cultural characteristics

The observation of the cultural characteristics was made in the same manner as described above, and the results are shown in the following Table 7.

TABLE 8

| Property: | Result |
|---|---|
| Production of melanoid pigment | Negative. |
| Tyrosinase reaction | Do. |
| Acid formation from glucose | Positive. |
| Nitrate reduction | Positive, strong. |
| Starch hydrolysis | Positive. |
| Gelatin liquefaction | Positive, strong. |
| Milk peptonization | Positive. |
| Producing antibiotic | Acyl peptide. |

This microorganism grows under an aerobic condition, and the optimum pH range for growth is 7.0 to 7.2. The utilization of carbon sources was observed in the

TABLE 7

| Medium | Property | Result |
|---|---|---|
| Czapek's agar | Growth | Good. |
| | AM | Good, light brownish gray. |
| | SM | Light brownish gray to brownish gray. |
| | SP | None. |
| Glycerin-Czapek's agar | Growth | Good. |
| | AM | Good, light brownish gray. |
| | SM | Light brownish gray. |
| | SP | None. |
| Glucose-asparagine agar | Growth | Fair. |
| | AM | Good, light brownish gray. |
| | SM | Light brownish gray to brownish gray. |
| | SP | None. |
| Glycerin-asparagine agar | Growth | Good. |
| | AM | Good, brownish white to light brownish gray. |
| | SM | Light brownish gray to pale yellowish brown. |
| | SP | None. |
| Calcium malate agar | Growth | Poor. |
| | AM | Poor, brownish white. |
| | SM | Colorless to light brownish gray. |
| | SP | None. |
| Starch agar | Growth | Fair. |
| | AM | Good, light brownish gray. |
| | SM | Light brownish gray. |
| | SP | None. |
| Nutrient agar | Growth | Fair. |
| | AM | Poor, brownish white. |
| | SM | Pale yellowish brown. |
| | SP | None. |
| Glucose-peptone agar | Growth | Fair. |
| | AM | Fair, white to yellowish gray. |
| | SM | Pale yellowish brown. |
| | SP | None. |
| Potato | Growth | Good. |
| | AM | Poor, brownish white. |
| | SM | Dark brown. |
| | SP | None. |
| Bennett's agar | Growth | Good. |
| | AM | Good, brownish gray. |
| | SM | Brownish gray. |
| | SP | None. |
| Gelatin medium | Growth | Fair. |
| | AM | No aerial mycelium. |
| | SM | Pale brown. |
| | SP | None. |
| Milk medium | Growth | Good, pellicle. |
| | AM | Poor, brownish white. |
| | SM | Pale brown. |
| | SP | None. |
| Cellulose | Growth | No growth to scant. |
| | AM | |
| | SM | |
| | SP | |
| Bennett's agar | Growth at 28° C | Good. |
| | Growth at 37° C | Do. |
| | Growth at 45° C | Do. |
| Glucose broth | Growth type | Ring type. |

NOTE.—AM=Aerial mycelium; SM=Substrate mycelium; SP=Soluble pigment.

Physiological characteristics

The observation of the physiological characteristics was made in the same manner as described above, and the results are shown in the following Table 8.

same manner as described above, and the results are shown in the following Table 9, wherein the marks "+" and "++" indicate increasing utilization, the mark "—" no utilization and the mark "±" doubtful utilization.

TABLE 9

| Carbon source | Result | |
|---|---|---|
| Glycerin | Good growth | ++ |
| Glucose | do | ++ |
| Inositol | Fair growth | + |
| Mannitol | do | + |
| Rhamnose | Good growth | ++ |
| Galactose | Fair growth | + |
| Xylose | do | + |
| Arabinose | Faint growth | ± |
| Fructose | do | ± |
| Maltose | do | ± |
| Lactose | do | ± |
| Sucrose | No growth | − |
| Raffinose | do | − |
| Mannose | do | − |
| Inulin | do | − |
| Sorbitol | do | − |
| Dulcitol | do | − |
| Salicin | do | − |
| Sorbose | do | − |

From the above results, it is apparent that these three strains should be placed into the genus Streptomyces, and their characteristics are summarized in the Table 10. From the said Table 10, it appears that the strain Z–237 is very closely related to the strain Z–242. Accordingly, the characteristics of the strain Z–237 were compared with those of the strain Z–242 in more detail, and it was recognized that the characteristics of both strains are identical except for the utilization of a few kinds of carbon sources. Therefore, it has been decided that these two strains, i.e. Z–237 and Z–242, should be placed into the same species.

some differences between them in the following properties: (1) acid formation from glucose, (2) color of aerial mycelium on synthetic agar medium and glucose-asparagine agar medium, (3) ability of aerial mycelium formation on glucose-asparagine agar medium, (4) color of substrate mycelium on calcium malate agar and (5) utilization of carbon sources such as fructose, maltose, lactose, arabinose and sucrose. Therefore, it has been decided that both strains should be placed into the very closely related species.

As described hereafter, the antibiotic tsushimycin is an acidic acyl peptide related to the so-called "amphomycin-glumamycin group of antibiotics." So, Streptomyces Z–237 and Streptomyces N–946 were compared in detail with the amphomycin-glumamycin group antibiotics-producing strains such as *Streptomyces griseus* var. *spiralis*, *Streptomyces violaceus* T–3190, *Streptomyces canus*, *Streptomyces violaceus* 7, Streptomyces 891 and *Streptomyces zaomyceticus* described in Waksman and Lechevalier's "The Actinomycetes, Volume 3." As the result of the said comparative investigations, it has been concluded that the strains, i.e. Z–237 and N–946, each differs apparently from the many known species of those amphomycin-glumamycin group antibiotics-produced Streptomyces.

Further, among many species of Streptomyces described in Bergey's "Manual of Determinative Bacteriology," Waksman and Lechevalier's "Actinomycetes and Their Antibiotics," Waksman's "The Actinomycetes" and other literatures, Streptomyces Z–237 and Streptomyces

TABLE 10

| Property | Strain Z-237 | Strain Z-242 | Strain N-946 |
|---|---|---|---|
| Morphology: | | | |
| Sporophore | Sprial | Spiral | Spiral. |
| Spore surface | Spiny | Spiny | Spiny. |
| Growth temperature: | | | |
| At 28° C | Good | Good | Good. |
| At 37° C | do | do | Do. |
| At 45° C | do | do | Do. |
| Czapek's agar: | | | |
| Growth | Good | Good | Good. |
| AM | Good, brownish white to light brownish gray. | Good, brownish white to light brownish gray. | Good, light brownish gray. |
| SM | Light brownish gray | Light brownish gray | Light brownish gray to brownish gray. |
| SP | None | None | None. |
| Glucose-asparagine agar: | | | |
| Growth | Good to fair | Fair | Fair. |
| AM | Poor, yellowish gray | Scant | Good, light brownish gray to brownish gray. |
| SM | Yellowish gray | Yellowish gray | Light brownish gray to brownish gray. |
| SP | None | None | None. |
| Bennett's agar: | | | |
| Growth | Good | Good | Good. |
| AM | Good, light brownish gray | Good, light brownish gray | Good, brownish gray. |
| SM | Light brownish gray to brownish gray. | Light brownish gray to brownish gray. | Brownish gray. |
| SP | None | None | None. |
| Production of melanoid pigment | Negative | Negative | Negative. |
| Acid formation from glucose | do | do | Positive. |
| Tyrosinase reaction | do | do | Negative. |
| Nitrate reduction | Positive | Positive | Positive. |
| Growth type on glucose broth | Ring type | Ring type | Ring type. |

NOTE.—AM=Aerial mycelium; SM=Substrate mycelium; SP=Soluble pigment.

Further, as the results of comparisons of the morphological, cultural and physiological characteristics, it was found that the strain N–946 is related to the strain Z–237 in the most of properties, but there can be pointed out N–946 appeared to be closely related to *Streptomyces pseudogriseolus* H–16–C. Hence, detailed comparative studies were carried out among them, and the results are shown in the following Table 11.

TABLE 11

| Property | Streptomyces, strain Z-237 | Streptomyces, strain N-946 | Streptomyces pseudogriseolus, strain H-16-C |
|---|---|---|---|
| Morphology: | | | |
| Sporophore | Spiral | Spiral | Spiral. |
| Spore surface | Spiny | Spiny | Spiny. |
| Spore | Oval to cylindrical | Cylindrical to oval | Oval to cylindrical. |
| Czapek's agar: | | | |
| Growth | Good | Good | Good. |
| AM | Good, brownish white to light brownish gray | Good, light brownish gray | Poor, brownish white to light brownish gray. |
| SM | Light brownish gray | Light brownish gray to brownish gray | Yellowish gray. |
| SP | None | None | None. |
| Glucose-asparagine agar: | | | |
| Growth | Good to fair | Fair | Fair. |
| AM | Poor, yellowish gray | Good, light brownish gray | None. |
| SM | Yellowish gray | Light brownish gray to brownish gray | Colorless to yellowish gray. |
| SP | None | None | None. |
| Glycerin-asparagine agar: | | | |
| Growth | Good | Good | Fair to good. |
| AM | Fair to good, brownish white | Good, brownish white to light brownish gray | Poor, brownish white. |
| SM | Light brownish gray to pale yellowish brown | Light brownish gray to pale yellowish brown | Light brownish gray. |
| SP | None | None | None. |
| Calcium malate agar: | | | |
| Growth | Fair to poor | Poor | Poor. |
| AM | Fair, grayish white | Poor, brownish white | None. |
| SM | Yellowish gray | Colorless to light brownish gray | Colorless to yellowish gray. |
| SP | None | None | None. |
| Nutrient agar: | | | |
| Growth | Fair | Fair | Good. |
| AM | Poor, yellowish gray to brownish white | Poor, brownish white | Poor, white. |
| SM | Pale yellow to pale yellowish brown | Pale yellowish brown | Pale yellowish brown. |
| SP | None | None | None. |
| Glucose-peptone agar: | | | |
| Growth | Fair | Fair | Fair. |
| AM | Fair to poor, white | Fair, white to yellowish gray | None. |
| SM | Pale yellowish brown | Pale yellowish brown | Yellowish gray. |
| SP | None | None | None. |
| Potato: | | | |
| Growth | Good | Good | Good. |
| AM | Fair, brownish white | Poor, brownish white | Poor, white. |
| SM | Grayish yellow brown | Dark brown | Grayish yellow brown. |
| SP | None | None | Pale yellowish brown. |
| Bennett's agar: | | | |
| Growth | Good | Good | Good. |
| AM | Good, light brownish gray | Good, brownish gray | None. |
| SM | Light brownish gray to brownish gray | Brownish gray | Pale yellowish brown to yellowish brown. |
| SP | None | None | None. |
| Gelatin medium: | | | |
| Growth | Fair | Fair | Good. |
| AM | None | None | None (poor, grayish white). |
| SM | Pale brown | Pale brown | Yellowish gray. |
| SP | None | None | None. |
| Milk medium: | | | |
| Growth | Good | Good | Good. |
| AM | Poor, brownish white | Poor, brownish white | Poor, brownish white. |
| SM | Pale brown | Pale brown | Pale brown. |
| SP | None | None | None. |
| Cellulose agar | No growth | No growth to scant | No growth. |
| Growth temperature [1]: | | | |
| At 28° C | Good | Good | Good, no AM. |
| At 37° C | do | do | Good, fair AM. |
| At 45° C | do | do | Do. |
| Growth type on glucose broth | Ring type | Ring type | Ring type, later pellicle. |
| Production of melanoid pigment | Negative | Negative | Negative. |
| Tyrosinase reaction | do | do | Do. |
| Acid formation from glucose | do | Positive | Do. |
| Nitrate reduction | Positive | do | Positive. |
| Starch hydrolysis | do | do | Do. |
| Gelatin liquefaction | do | do | Do. |
| Milk peptonization | do | do | Do. |
| Utilization of carbon sources: | | | |
| Glycerin | ++ | ++ | ++. |
| Glucose | ++ | ++ | ++. |
| Xylose | ++ | + | +. |
| Inositol | ++ | + | ++. |
| Mannitol | ++ | + | ++. |
| Fructose | ++ | ± | ++. |
| Rhamnose | ++ | ++ | ++. |
| Galactose | ++ | + | +. |
| Maltose | ++ | ± | ++. |
| Mannose | ++ | − | +. |
| Arabinose | + | ± | +. |
| Sucrose | + | − | −. |
| Lactose | + | ± | ++. |
| Raffinose | − | − | −. |
| Inulin | − | − | −. |
| Sorbitol | − | − | −. |
| Ducitol | − | − | −. |
| Salicin | − | − | −. |
| Sorbose | − | − | −. |

[1] Bennett's agar.

NOTE.—AM Aerial mycelium; SM=Substrate mycelium; SP=Soluble pigment; ++=Good growth; +=Fair growth; ±=Faint growth; −=No growth.

As apparent from the Table 11, Streptomyces Z-237 is quite closely related to *Streptomyces pseudogriseolus* H-16-C, and it can be concluded that Streptomyces Z-237 should be identified as *Streptomyces pseudogriseolus*. But, this strain differs from *Streptomyces pseudogriseolus* H-16-C in the points of ability of aerial mycelium formation on calcium malate agar, Bennett's agar, glucose-asparagine agar and glucose peptone agar, and utilization of sucrose. Thus, the microorganism has been designated a new strain belonging to *Streptomyces pseudogriseolus* and named *Streptomyces pseudogriseolus* Z–237. This means also that Streptomyces Z–242 is a new strain belonging to the same species, and this strain has been likewise named *Streptomyces pseudogriseolus* Z–242.

On the other hand, there can be noted considerable similarity between *Streptomyces pseudogriseolus* H–16–C and Streptomyces N–946 in the points of forms of sporulating hyphae, structures of spore surface, production of melanoid pigment, and colors of aerial mycelium and substrate mycelium on various culture media. However, Streptomyces N–946 differs from *Streptomyces pseudogriseolus* in the morphological properties, e.g. formation of aerial mycelium on glucose-asparagine agar, glucose-peptone agar and Bennett's agar, and physiological properties, e.g. acid formation from glucose and utilization of carbon sources. Thus, the microorganism has been designated a new varietas of *Streptomyces peudogriseolus* and named *Streptomyces pseudogriseolus* var. *glucofermentans*, var. nov.

It is to be understood that for the production of tsushimycin, the present invention is not limited to the use of *Streptomyces pseudogriseolus* Z–237, *Streptomyces pseudogriseolus* Z–242 and *Streptomyces pseudogriseolus* var. *glucofermentans*, var. nov. It is especially desired and intended to include the use of natural or artificial mutants or variants produced from the described organisms as far as they can produce the antibiotic tsushimycin. The artificial production of mutants or variants may be accomplished by a conventional operation such as X-rays, ultraviolet-rays irradiation, nitrogen mustards, 4-nitroquinoline N-oxide and other mutagens.

In accordance with one aspect of the present invention, the new antibiotic tsushimycin is produced during cultivating of the microorganisms, e.g. *Streptomyces pseudogriseolus* Z–237, *Streptomyces pseudogriseolus* Z–242, *Streptomyces pseudogriseolus* var. *glucofermentans*, var. nov., in an aqueous nutrient medium at a temperature of about 25 to about 45° C., preferably 25 to 30° C., under aerobic conditions. The composition of this nutrient medium may be varied over a very wide range. Essentially what is required is a carbon source, a nitrogen source and a trace of inorganic elements. Examples of suitable carbon sources are glucose, sucrose, xylose, fructose, galactose, innositol, mannitol, glycerol, dextrin, starch, organic acids, molasses and the like. Suitable sources of nitrogen for the fermentation process include meat extract, peptone, soybean meal, corn steep liquor, yeast extract, peanut meal, wheat gluten, cotton seed flour, rice bran, casamino acid (acid hydrolyste of casein), NZ amine (enzymatic hydrolysate of casein), ammonium sulfate, ammonium carbonate, ammonium chloride and the like. Examples of suitable sources of inorganic elements are mineral salts such as sodium chloride, potassium chloride, calcium carbonate, potassium phosphate and the like. The nutrient medium may or may not be adjusted to about pH 5.0 to 7.0 prior to inoculation of the microorganism. The pH tends to remain rather within this range during the fermentation, but, if variations are encountered, a buffering agent such as calcium carbonate may be added to the medium. In addition, if excessive foaming is encountered, anti-foaming agents such as vegetable oils, lard oil and polypropylene-glycol may be added to the fermentation medium prior to or in the course of the fermentation. For a large scale of production, it is preferred to carry out the fermentation under a submerged aerobic condition. The maximum yields of the antibiotic tsushimycin can be obtained within about 20 to about 100 hours, usually about 70 hours, of fermentation under optimum conditions of temperature and aeration.

After growth of the microorganism, the antibiotic tsushimycin can be recovered from the cultured broth by a per se conventional manner. For this purpose, it may be noted that the antibiotic tsushimycin is an amphoteric compound having an isoelectric point at about pH 3.0. Accordingly, it may be recommended to adopt solvent extraction procedures at an acidic pH or precipitation procedures from an aqueous solution at the isoelectric point. For instance, the cultured broth is adjusted to an alkaline pH, e.g. about pH 9.0 to 10.0, and the mycelium is removed from the broth by using standard equipment such as filter-press and centrifuges. If desired, a suitable filtering aid such as diatomaceous earth (e.g. "Celite") may be employed. Then, the filtrate is acidified and extracted with a water-immiscible organic solvent such as butanol. The thus obtained crude active component is further purified by suitable operations such as re-precipitation, chromatography and the like. For example, the re-precipitation may be carried out by dissolving the crude material in a lower alkanol and then adding ethyl acetate to the solution. Alternatively, the re-precipitation may be effected by dissolving the crude active component in an alkaline water and subsequently adjusting the aqueous solution to about pH 3.0. The preferred chromatographic absorbents are silica gel, silicic acid and the like. Further, the antibiotic tsushimycin may be converted into such a salt being suited to purification procedures as ammonium salt, sodium salt, potassium salt, a heavy metal salt and the like.

The antibiotic tsushimycin in a free acid form is a colorless amorphous powder melting at 230 to 240° C. with decomposition. It is very soluble in an acidic and alkaline water, soluble in a lower alkanol, e.g. methanol, ethanol, and insoluble in acetone, ethyl acetate, chloroform and ether. The elementary analytical values of tsushimycin dried at 100° C. in vacuo to constant weight are as follows: C, 53.79%; H, 7.21%; N, 13.78%; no sulfur and halogen. When brought into contact with moisture, it takes a certain amount of water to constant weight, and the elementary analytical values of the hydrated tsushimycin (hereafter "tsushimycin" is intended to refer to the hydrated tsushimycin unless otherwise specified) are as follows: C, 49.98%; H, 7.53%; N, 12.76%; $H_2O$, 7.39%. The molecular weight of tsushimycin is about 1400 by the osmometry in 95% methanol and the neutralization equivalent is 445 by titration in 50% aqueous methanol. These analyses suggest a possible molecular formula $C_{59}H_{93}O_{20}N_{13} \cdot 6H_2O$ for tsushimycin. The specific rotation of tsushimycin is $[\alpha]_D^{23}$ +12.9° ±0.5° (c.=0.981% in methanol), $[\alpha]_D^{22.5}$ +13.2°±0.5° (c.=0.925% in ethanol) and $[\alpha]_D^{22.5}$ —6.0±0.5° (c.=0.876% in 1 M phosphate buffer, pH 6.0). The ultraviolet absorption spectrum in methanol is characterized by only an absorption at 207 m$\mu$. The infrared absorption spectrum of tsushimycin, run as potassium bromide tablet, shows the following characteristic frequencies: 3300, 3040, 2920, 1725, 1655, 1530, 1450 and 1015 cm.$^{-1}$ (shown in the accompanying drawings, FIG. 1). Thin-layer chromatographic analysis gives a single spot of R$f$=0.37–0.40 on silica gel G with n-butanol-acetic acid-water (3:1:1) and of R$f$=0.16–0.19 on silica gel G with ethanol-14% aqueous ammonia (8:2) as detected by bioautography and also by sulfuric acid. It gives positive Ninhydrin, Dragendorff and biuret reactions and decolorizes potassium permanganate and bromine. A two-dimensional paper chromatography of an acid-hydrolysate of tsushimycin, one dimension developed with n-butanol-acetic acid-water (4:1:2) and the other dimension migrated subsequently by electrophoresis at 300 volts for 3 hours in N acetic acid gives spots corresponding to aspartic acid, glycine, proline, pipecolic acid, an unknown acidic amino acid and an unknown basic amino acid as detected by Ninhydrin and isatin solution. By an automatic amino acid analysis, the following amino acids are determined: aspartic acid (3.98 moles), proline (1.03 moles), glycine (2.00 moles), valine (0.98 mole), pipecolic acid (not measured), an unknown basic amino acid (not measured) and ammonia (0.35 mole). The fatty acid components of the antibiotic tsushimycin are determined to be isotetradecenoic acid and isopentadecenoic acid (approximately 1:1) by a gas chromatographic comparison with authentic samples as methyl esters. This can be confirmed also by a gas chromatographic comparison of the catalytically hydrogenated fatty acid components with authentic samples of isotetradecanoic acid and isopentadecanoic acid.

On the basis of the above physical and chemical properties, tsushimycin is considered to be new and different from any of known antibiotics available for comparison.

Tsushimycin shows activity against a variety of microorganisms. The in vitro antimicrobial activity of the antibiotic was determined by the agar streak dilution method or by the tube dilution method. The results are shown in the following Table 12.

TABLE 12

| Test organism: | Minimum inhibitory concentration, mcg./ml. |
|---|---|
| Bacillus anthracis | 0.5 |
| Bacillus subtilis, PCI-219 | 0.5 |
| Staphylococcus aureus, 209 P | 1.0 |
| Sarcina lutea | 1.0 |
| Diplococcus pneumoniae, I | 1.0 |
| Diplococcus pneumoniae, I–V | 1.0 |
| Diplococcus pneumoniae, II | 0.5 |
| Diplococcus pneumoniae, III | 0.5 |
| Streptococcus hemolyticus, D | 1.0 |
| Streptococcus hemolyticus, HA | 1.0 |
| Corynebacterium diphtheriae, S | 0.5 |
| Corynebacterium diphtheriae, T | 0.5 |
| Shigella dysenteriae | >100 |
| Shigella paradysenteriae, Ohara | >100 |
| Salmonella typhi | >100 |
| Salmonella paratyphi, A | >100 |
| Escherichia coli, Umezawa | >100 |
| Pseudomonas aeruginosa | >100 |
| Klebsiella pneumoniae | >100 |
| Mycobacterium tuberculosis var. hominis, H37Rv | >100 |

From the above Table 12, it is seen that tsushimycin is highly active against gram-positive bacteria and with little or no activity against gram-negative bacteria and mycobacteria.

Because of its activity in vitro against gram-positive bacteria, chemotherapeutic tests in mice with experimental Diplococcus pneumoniae and Streptococcus hemolyticus infections were carried out by subcutaneous administration of tsushimycin, and the $ED_{50}$ values were determined to be 0.62 mg./kg. and 1.5 mg./kg., respectively.

Acute toxicity studies on tsushimycin were carried out in mice, and the $LD_{50}$ value has found to be 100 to 200 mg./kg. intraperitoneally, 200 to 300 mg./kg. subcantaneously and 100 to 200 mg./kg. intravenously.

The new antibiotic tsushimycin is useful as an agent for inhibiting the growth of gram-positive pathogenic microorganisms. It is useful for sterilizing equipment, for example surgical instruments. It is also useful in obtaining pure cultures of single organisms where a susceptible organism may be separated from a resistant one.

In another aspect of the invention, it relates also to hydrogenated tsushimycin and process for conversion of tsushimycin into hydrogenated tsushimycin. The hydrogenation of tsushimycin may be executed according to a conventional catalytic hydrogenation procedure. That is, the antibiotic tsushimycin is treated with hydrogen in a suitable solvent such as methanol, ethanol, propanol, butanol and the like in the presence of a hydrogenation catalyst such as a platinum catalyst, palladium catalyst and nickel catalyst. The reaction can be carried out at room temperature, i.e. about 10 to 30° C., under atmospheric pressure, until one molar equivalent of hydrogen is consumed.

Thus-obtained hydrogenated tsushimycin is an amphoteric compound having an isoelectric point at about pH 3.0, and a colorless amorphous powder melting at 233 to 243° C. with decomposition. The solubility is almost the same with that of tsushimycin. The elementary analytical values of hydrogenated tsushimycin dried at 100° C. in vacuo to constant weight are as follows: C, 54.09%; H, 7.34%; N, 13.76%. When brought into contact with moisture, it takes a certain amount of water to constant weight, and the elementary analytical values of the hydrated hydrogenated tsushimycin (hereafter "hydrogenated tsushimycin is intended to refer to the hydrated one unless otherwise specified) are as follows: C, 48.76%; H, 7.72%; N, 12.40%; $H_2O$, 9.86%. The specific rotation of hydrogenated tsushimycin is $[\alpha]_D^{23}$ +14.1°±0.5° (c.=0.944% in methanol). The ultraviolet absorption spectrum in methanol is characterized by only an absorption at 207 m$\mu$. The infrared absorption spectrum of hydrogenated tsushimycin, run as potassium bromide tablet, shows the following characteristic frequencies: 3310, 3050, 2920, 1720, 1655, 1530, 1450, 1384, 1235 and 1015 cm.$^{-1}$ (shown in the accompanying drawings, FIG. 2). The amino acid components of hydrogenated tsushimycin are identical to those of tsushimycin, and the fatty acid components are identified with authentic samples of isotetradecanoic acid and isopentadecanoic acid by a gas chromatography as methyl esters.

Hydrogenated tsushimycin shows a similar activity against microorganisms to tsushimycin. The in vitro antimicrobial activity was studied, and the results are shown in the following Table 13.

TABLE 13

| Test organism: | Minimum inhibitory concentration, mcg./ml. |
|---|---|
| Bacillus anthracis | 0.5 |
| Bacillus subtilis, PCI-219 | 0.5 |
| Staphylococcus aureus, 209 P | 1.0 |
| Sarcina lutea | 1.0 |
| Diplococcus pneumoniae, I | 1.0 |
| Diplococcus pneumoniae, I–V | 1.0 |
| Diplococcus pneumoniae, II | 0.5 |
| Diplococcus pneumoniae, III | 0.5 |
| Streptococcus hemolyticus, D | 1.0 |
| Streptococcus hemolyticus, HA | 1.0 |
| Corynebacterium diphtheriae, S | 0.5 |
| Cornyebacterium diphtheriae, T | 0.5 |

From the above Table 13, it is seen that hydrogenated tsushimycin is highly active against gram positive bacteria, and the antibacterial spectrum is quite similar to that of tsushimycin. The $LD_{50}$ value of hydrogenated tsushimycin was determined in mice to be 200 to 300 mg./kg. intravenously.

Thus, the new compound, hydrogenated tsushimycin, is useful as an agent for inhibiting the growth of gram-positive pathogenic microorganisms. It is useful for sterilizing equipmnt, for example surgical instruments. It is also useful in obtaining pure cultures of single organisms where a susceptible organism may be separated from a resistant one.

The following examples are given solely for the purpose of illustration and are not to be construed as limitations of the present invention, many variations of which are possible.

EXAMPLE 1

A nutrient medium (20 litres) is prepared from the following materials:

| | Percent (w./v.) |
|---|---|
| Glucose | 2.0 |
| Meat extract | 0.5 |
| Peptone | 0.5 |
| Sodium chloride | 0.5 |
| Calcium carbonate | 0.35 |

Water is added to the desired volume (20 litres).

After adjusting the mixture of pH 7.0, the medium is placed in a jar-fermentor and sterilized. Then, the medium is inoculated with *Streptomyces pseudogriseolus* Z–237, and cultivated under agitation of 250 r.p.m. and aeration of 20 litres per minute at 27° C. for 72 hours, whereby the concentration of tsushimycin amounts approximately to 100 mcg./ml.

About 60 litres of the cultured broth is adjusted to pH 9.5 with a dilute sodium hydroxide solution under vigorous stirring and filtered by the aid of Celite (600 g.). The mycelial cake is washed with 15 litres of water adjusted to pH 9.5. The filtrate and the washing are combined, acidified with hydrochloric acid to pH 2.0, and extracted with 15 litres of n-butanol. The n-butanol solution is shaken with 5 litres of water adjusted to pH 9.5 twice, the aqueous layer is adjusted to pH 2.0, and extracted with 3 litres of n-butanol. The final n-butanol solution is concentrated under reduced pressure to give a syrupy material, which is then treated with ethyl acetate to give a brown powder. Dissolution into a minimal volume of methanol and precipitation by addition of ethyl acetate give 6.2 grams of crude tsushimycin as a pale brown powder (ca. 67% activity).

EXAMPLE 2

Twenty-five grams of active carbon (Darco G–60) is slurried with methanol and placed on a glass filter to form a layer of approximately 2 cm. in thickness. Five grams of the crude product obtained in the preceding example is dissolved in 50 millilitres of methanol and the solution is passed through the carbon layer. The eluate and subsequent methanol washings are combined and concentrated under reduced pressure. The residue is treated with ethyl acetate to give 2.7 g. of colorless powder of tsushimycin (ca. 86% activity).

EXAMPLE 3

One point five grams of the decolorized product obtained in the preceding example is applied to a silica gel column (Merck, 0.5–0.8 mm., 300 grams; column size, 3.2 x 70 cm.) and developed with ethanol-1.4% aqueous ammonia (4:1). Tsushimycin is eluted partly overlapping with a minor component. The fractions containing tsushimycin are collected and concentrated under reduced pressure. The resulted residue is treated with ethanol to give 1.14 grams of ammonium salt of tsushimycin as a colorless fine crystalline powder (ca. 94% activity).

EXAMPLE 4

Five hundred milligrams of the ammonium salt obtained in the preceding example is suspended in 50 millilitres of water, adjusted to pH 2.0 with a dilute hydrochloric acid, and extracted with n-butanol. The extract is washed with water and concentrated under reduced pressure. The residue is dissolved in methanol and precipitated by addition of ethyl acetate to give 348 milligrams of pure tsushimycin in free acid form as a colorless amorphous powder.

EXAMPLE 5

*Streptomyces pseudogriseolus* Z–242 is cultivated in a similar manner to the Example 1. From 60 litres of the cultured broth is obtained 7.1 grams of crude tsushimycin (ca. 52% activity).

EXAMPLE 6

*Streptomyces pseudogrisoelus* var. *glucofermentans*, var. nov. is cultivated in a similar manner to the Example 1. From 60 litres of the cultured broth is obtained 9.3 grams of crude tsushimycin (ca. 47% activity).

EXAMPLE 7

To a solution of 500 milligrams of tsushimycin in 25 millilitres of methanol is added 50 milligrams of Adams' catalyst, and the mixture is subjected to a catalytic reduction at room temperature under an atmospheric pressure for 1 hour, whereby about 10 millilitres of hydrogen is consumed. To the mixture is added 500 milligrams of active carbon and filtered. The filtrate is concentrated under reduced pressure, and the residue is treated with ethyl acetate to give hydrogenated tsushimycin. Yield, 450 milligrams.

What is claimed is:

1. An antibiotic, tsushimycin, said antibiotic being a colorless, amphoteric, amorphous powder having an isoelectric point at about pH 3.0, melting at 230 to 240° C. with decomposition, containing the elements carbon, hydrogen, oxygen and nitrogen in substantially the following proportions by weight:

| | Percent |
|---|---|
| Carbon | 49.98 |
| Hydrogen | 7.53 |
| Nitrogen | 12.76 |
| Water | 7.39 | having an optical rotation of $[\alpha]_D^{23} +12.9° \pm 0.5°$ (c.= 0.981% in methanol), a molecular weight of about 1400 and a neutralization equivalent of 445, and showing an infrared absorption spectrum defined in FIG. 1.

Figure 2:
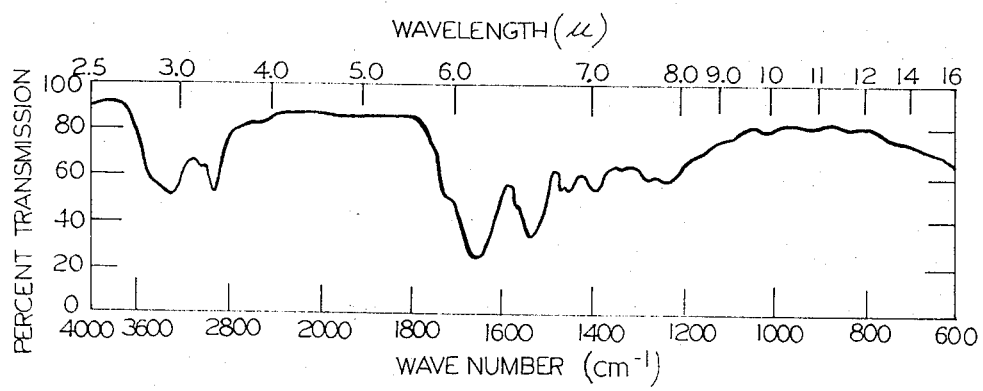

2. Hydrogenated tsushimycin, a colorless, amphoteric, amorphous powder having an isoelectric point at about pH 3.0, melting at 233 to 243° C. with decomposition, containing the elements carbon, hydrogen, oxygen and nitrogen in substantially the following proportions by weight:

| | Percent |
|---|---|
| Carbon | 48.76 |
| Hydrogen | 7.72 |
| Nitrogen | 12.40 |
| Water | 9.86 | having a specific rotation of $[\alpha]_D^{23} +14.1 \pm 0.5°$ (c.= 0.944% in methanol) and showing an infrared absorption spectrum defined in FIG. 2.

3. A process for producing tsushimycin as defined in claim 1, which comprises cultivating a microorganism strain selected from the group consisting of *Streptomyces pseudogriseolus* (ATCC 21139), *Streptomyces pseudogriseolus* (ATCC 21140) and *Streptomyces pseudogriseolus* var. *glucofermentans* var. nov. (ATCC 21141) in an aqueous nutrient medium under aerobic conditions until sufficient antibacterial activity has been imported to the medium, and recovering the accumulated antibiotic from the cultured broth.

4. A process according to claim 3, wherein the recovery of the antibiotic is carried out by adjusting the cultured broth to pH 9.5 with sodium hydroxide, removing the mycelium by filtration, adjusting the filtrate to pH 2.0 with hydrochloric acid and extracting with n-butanol.

5. A process according to claim 3, wherein the cultivation of the microorganism is carried out at a temperature of about 25 to 45° C.

6. A process according to claim 3, wherein the cultivating of the microorganism is carried out under a submerged aerobic condition.

References Cited

Japan Med. Gazette, Feb. 20, 1969, p. 10.

Derwent Farmdoc No. 38,413, abstracting GE 1,800,363, published July 3, 1969.

JEROME D. GOLDBERG, Primary Examiner

U.S. Cl. X.R.

195—80